Patented Jan. 23, 1951

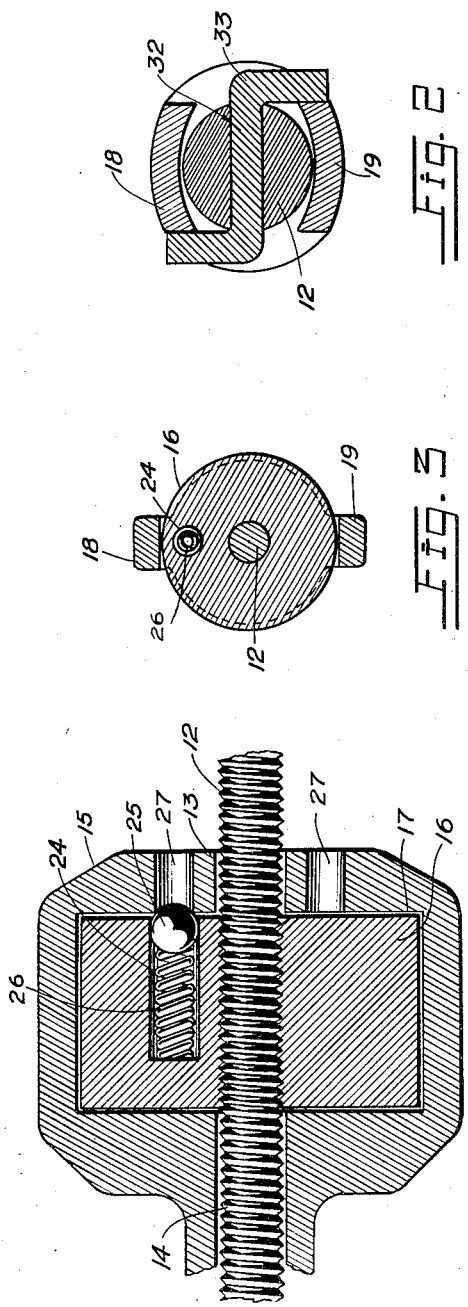
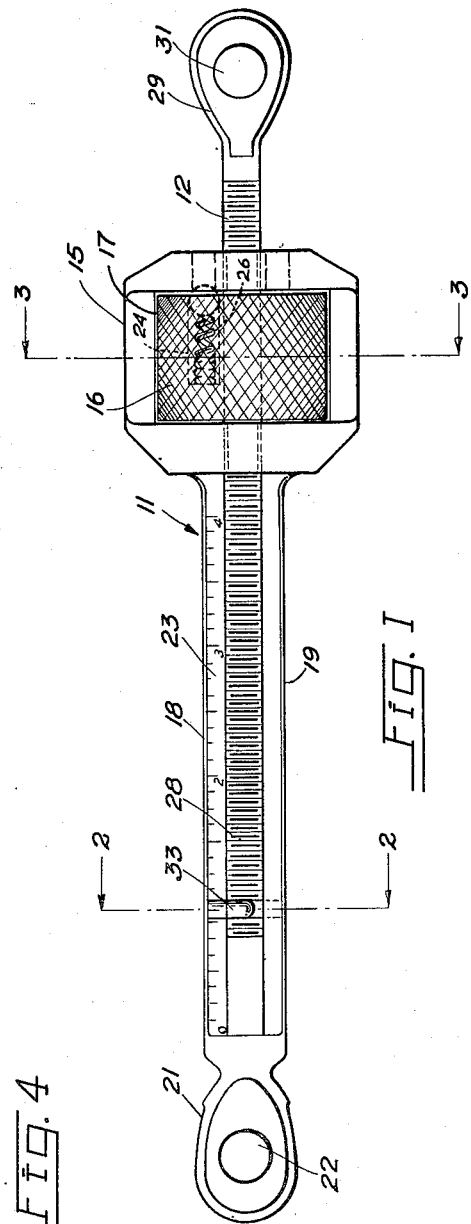

2,538,757

UNITED STATES PATENT OFFICE 2,538,757

TURNBUCKLE AND LOCKING DEVICE THEREFOR

Clifford C. Bratthauer, United States Navy, Charles E. Gallagher, Doylestown, Pa., and Willard S. Clewell, United States Navy Application February 7, 1945, Serial No. 576,682

4 Claims. (Cl. 287—62)

(Granted under the act of March 3, 1883, as amended April 30, 1928; 370 O. G. 757)

This invention relates to improvements in tensioning devices, and in particular to turnbuckles adapted to be attached readily to two members to which tension is to be applied and adapted to be adjusted and locked in position.

It is an object of this invention to provide a turnbuckle that can be adjusted easily throughout its range without the use of special tools and that can be locked in place without the use of safety wire, shellac or other expendible means.

Another object of this device is to provide a turnbuckle having a positive stop, thereby preventing separation of and loss of any of the component parts.

A further object is to provide a turnbuckle having an indicator associated therewith by which the amount of adjustment thereof can be determined readily.

Still a further object of this invention is to provide a turnbuckle of minimum size and weight, and one that can be placed in a location in which space is at a premium.

A further object is to provide a turnbuckle for employment in such places where twisting of cables or members to which it is attached can not be tolerated.

These and various other novel features and advantages of this invention will become apparent from a reading of the specification and drawing, in which Fig. 1 is a top plan view of the turnbuckle;

Fig. 2 is an enlarged sectional view taken at 2—2 of Fig. 1;

Fig. 3 is a sectional view taken at 3—3 of Fig. 1; and

Fig. 4 is a cut-away view of the adjusting mechanism of the turnbuckle.

Similar numerals refer to similar parts throughout the several views.

The turnbuckle comprises a frame 11, adjustable threaded rod 12 passing through suitable apertures 13 and 14 in the head 15 of frame 11, and an adjusting knob 16 mounted within the slot or opening 17 of head 13. Rod 12 is threaded through said knob 16.

The frame 11 consists of two parallel arms 18 and 19, formed integral with head 15, and terminating in an end member 21 having an eye 22 formed therein. A pin or other fastening means can be passed through said eye for securing one end of the turnbuckle to a rod or cable to which tension is to be applied. On one of the arms 18 is inscribed a suitable scale 23, marked off preferably in inches and fractional parts thereof.

Adjusting knob 16 is provided with a well 24 disposed parallel to rod 12. A ball 25 and compression spring 26 tending to urge the ball outward are mounted movably in said well. Two bores 27, slightly less in diameter than that of the ball, are provided in the end of head 15, said bores 27 being adapted to permit a portion of the ball 25 to project therein, thereby furnishing the locking action for securing the adjusting knob in the desired position.

Rod 12, consists of a threaded portion 28 terminating in an end member 29 having an eye 31 formed therein through which a pin or other fastening means is passed for securing the adjustable rod of the turnbuckle assembly to a cable or the like to which tension is to be applied.

At the opposite end of rod 12 is an aperture 32 into which a locking pin 33 is inserted and secured by bending into the shape as shown when the turnbuckle unit is assembled. The locking pin 33 is scribed at the proper point so that such marking coincides with the graduations of scale 23 to indicate at any instant the position for which the device has been adjusted.

In operation, the turnbuckle assembly, having been secured between the ends of two cables, rods or the like, is tightened by turning the rotatable knob 16, which causes the adjustable rod 12 to be drawn up within the two parallel arms 18 and 19 and the indicator pin 33 to be positioned at some point along the indicating scale 23. For each half turn of adjusting knob 16, the locking ball 25 comes into coincidence with one of the bores 27 of head 15, and is urged partially into the aperture by the compression spring 26. Thus a locking action takes place at each point of coincidence. Although but two such points are shown, it will be apparent that any number of such bores can be provided to furnish any desirable number of locking positions. Depending upon the usage to which the turnbuckle will be placed, the compression spring can be of any desired strength in order to prevent accidental turning of the adjusting knob with consequent loss of adjustment and yet have a sufficient yielding quality to permit ready adjustment.

It will be understood that the above description and accompanying drawings comprehend only the general and preferred embodiment of the invention and that various changes in construction, proportion and arrangement of the parts can be made within the scope of the claims without sacrificing any of the advantages of the invention.

The invention described herein may be manufactured and used by or for the Government of the United States of America for governmental purposes without the payment of any royalties thereon or therefor.

We claim:

1. A turnbuckle comprising a frame having a head formed at one end thereof and first cable-engaging means at the opposite end thereof, said head having a slot and a bore therein a threaded rod mounted slidably in said head and extending into said frame, said rod having second cable-engaging means at the end thereof opposite said first cable-engaging means, a knob positioned rotatably in the slot of said head and carrying said rod threadedly, and means to lock said knob to said head, said means including a well in said knob registerable with said bore in said head and means to position an element removably in said well and said bore simultaneously.

2. A turnbuckle comprising a frame having a head formed at one end thereof and first cable-engaging means at the opposite end thereof, said head having a slot and a bore therein a threaded rod mounted slidably in said head and extending into said frame, said rod having second cable-engaging means at the end thereof opposite said first cable-engaging means, a knob positioned rotatably in the slot of said head and carrying said rod threadedly, and means to lock said knob to said head, said means including a well in said knob registerable with said bore in said head and a spring seated compressibly in said well in said knob and carrying a sphere slidable into a position in said well and said bore partially simultaneously.

3. A turnbuckle comprising a frame having a head formed at one end thereof and first cable-engaging means at the opposite end thereof, a threaded rod mounted slidably in said head and extending into said frame, said rod having second cable-engaging means at the end thereof opposite said first cable-engaging means, a knob positioned rotatably interior said head and carrying said rod threadedly, spring-actuated means to lock said knob to said head, and means to prevent rotation of said rod relative to said frame.

4. A turnbuckle comprising a frame having a head formed at one end thereof and first cable-engaging means at the opposite end thereof, a threaded rod mounted slidably in said head and extending into said frame, said rod having second cable-engaging means at the end thereof opposite said first cable-engaging means, a knob positioned rotatably interior said head and carrying said rod threadedly, spring actuated means to lock said knob to said head, pin means to prevent rotation of said rod relative to said frame carried by said rod, and a scale carried on said frame parallel to the path of travel of said pin means.

CLIFFORD C. BRATTHAUER.
CHARLES E. GALLAGHER.
WILLARD S. CLEWELL.

REFERENCES CITED

The following references are of record in the file of this patent:

UNITED STATES PATENTS

| Number | Name | Date |
|---|---|---|
| 513,927 | Herrick | Jan. 30, 1894 |
| 602,569 | Turner | Apr. 19, 1898 |
| 1,018,910 | Kahle | Feb. 27, 1912 |
| 1,397,373 | Gemmer | Nov. 15, 1921 |
| 1,575,119 | Lorraine | Mar. 2, 1926 |
| 1,845,123 | Buhr | Feb. 16, 1932 |
| 2,080,666 | Leutwiler et al. | May 18, 1937 |
| 2,382,759 | Weiss et al. | Aug. 14, 1941 |